United States Patent [19]
Regnier

[11] 3,717,123
[45] Feb. 20, 1973

[54] INSTALLATION FOR THE PRESERVATION OF FISH ESPECIALLY ON BOARD FISHING BOATS

[75] Inventor: Paul Regnier, Dieppe, France
[73] Assignee: Ateliers & Chantiers de la Manche, Dieppe, France
[22] Filed: Feb. 17, 1971
[21] Appl. No.: 116,023

[30] Foreign Application Priority Data

March 3, 1970 France..................................7007488

[52] U.S. Cl........................................119/3, 210/169
[51] Int. Cl. .......................A01k 61/00, A01k 63/00
[58] Field of Search ....................119/2, 3, 5; 210/169

[56] References Cited

UNITED STATES PATENTS

| | | | |
|---|---|---|---|
| 2,696,800 | 12/1954 | Rork | 119/5 |
| 3,294,239 | 12/1966 | Dayes | 119/5 X |
| 3,540,593 | 11/1970 | Stewart | 210/169 |
| 2,275,428 | 3/1942 | Haldeman | 119/5 X |
| 3,279,430 | 10/1966 | Mugridge | 119/3 |
| 3,465,718 | 9/1969 | Handman et al. | 119/2 |
| 3,540,591 | 11/1970 | Yamazaki | 210/169 |

FOREIGN PATENTS OR APPLICATIONS 721,538    11/1965    Canada.................................119/3

Primary Examiner—Louis G. Mancene
Assistant Examiner—James H. Czerwonky
Attorney—Young & Thompson

[57] ABSTRACT

An installation for the preservation of fish, especially on board fishing boats comprising a tank containing a liquid such as brine and receiving the fish directly, a heat-exchanger inside said tank in order to cool the liquid, and a device for circulating the liquid inside the tank. The circulation device has a pump of the turbid liquid type drawing-in the liquid directly from the vicinity of the bottom of the tank and delivering said liquid into a conduit which returns it to the tank through a discharge orifice. The installation also comprises a filtering means including a plurality of foraminous baskets of substantial size mounted on the top of the tank in such manner as to be removable during operation, the size of the passage holes of said baskets decreasing progressively from the top to the bottom of the filtering means, said basket being interposed between the discharge orifice of said conduit and the tank so as to retain the fish-scales and other solid foreign matter.

2 Claims, 1 Drawing Figure

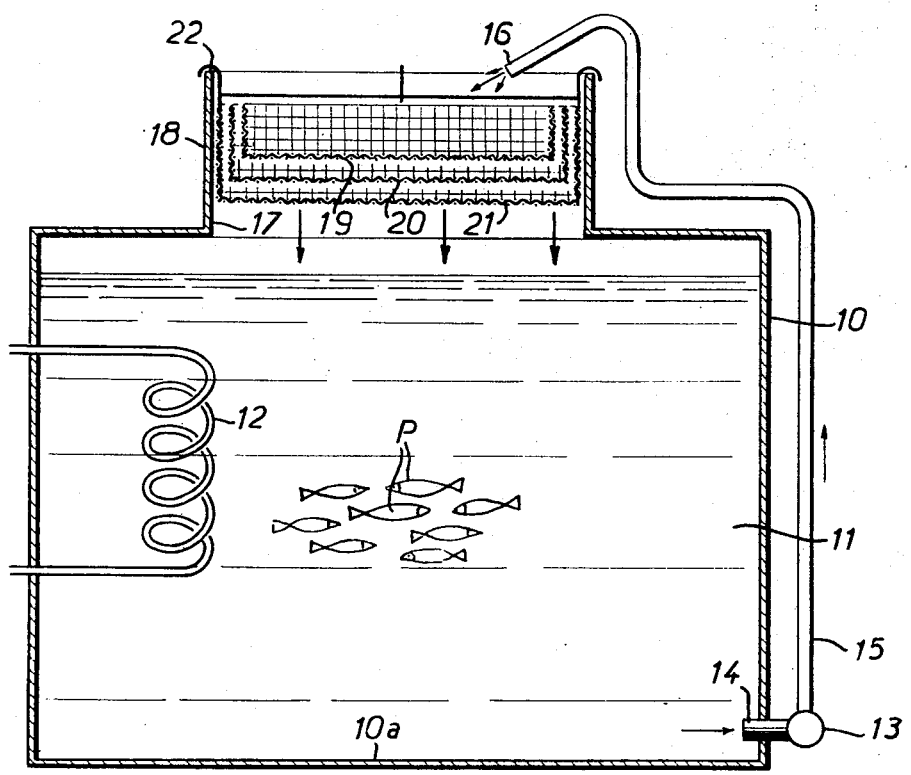

INSTALLATION FOR THE PRESERVATION OF FISH ESPECIALLY ON BOARD FISHING BOATS

The present invention relates to an installation for the preservation of fish, especially on board fishing boats, comprising a tank containing a liquid such as brine for receiving the fish, a heat exchanger in the tank for cooling the liquid, and a device for circulating the liquid inside the tank.

Generally speaking, in installations of this kind, especially on board ships which fish with a draw-net for sprats, anchovies, sardines, etc., and equipped for freezing these fish in brine, serious disadvantages are caused by the blocking-up with fish scales of the filters mounted in front of the circulating pumps. In practice, these filters become blocked after a short period of operation, which results in frequent stoppages and dismantling operations. It even happens sometimes that the mechanics simply remove the filtering elements, which results in the choking-up of the pumps.

The present invention has for its object an installation for the preservation of fish, especially on board fishing boats, which is free from these drawbacks and which at the same time is of particularly simple and convenient construction.

According to the invention, an installation for the preservation of fish on board fishing boats of the kind referred to, is especially characterized in that a pump of the turbid liquid type draws in the liquid such as brine directly from the tank and in the vicinity of the bottom of the tank, and delivers it into a conduit which returns it to the tank through a discharge orifice, and in that filtering means comprising at least one basket of extensive width is mounted on the top of the tank in such manner as to be removable during operation, these means being interposed between the said discharge orifice of the conduit and the tank in order to retain the fish scales and other solid foreign matter.

By virtue of this arrangement, no filter is provided at the suction side of the pumps, which prevents any fouling of this filter, and it is the basket or baskets of large capacity which retain the scales at the point where the delicacy of the pump discharges the brine into the tank.

It will be appreciated that these baskets are removable and can be cleaned without it being necessary to stop the circulation of the brine.

It is thus very easy to ensure the correct operation of the installation and there is no risk of interfering with the freezing of the fish, since the brine is circulated continuously through the tank without interruption.

The filtering means preferably comprise a number of superimposed baskets which are spaced apart from each other and the mesh of which, that is to say the size of the passage holes progressively decreases from the top to the bottom.

One form of embodiment of the invention is described below by way of example, reference being made to the accompanying drawing, in which the single FIGURE is a diagrammatic view in cross-section of an installation according to the invention.

In the example shown, an installation for the preservation of fish on board fishing boats comprises a tank 10 containing the brine 11 and receiving the fish P, for example sprats, anchovies, sardines, etc.

A heat exchanger 12, for example a tubular coil through which passes a refrigerant fluid, is arranged inside the tank 10 in order to cool the brine 11.

A device is provided for circulating and stirring the brine 11 inside the tank in order to permit efficient freezing of the fish P, for example at a temperature maintained at about −15° C. or −18° C. This circulating device comprises a pump 13 of the turbid liquid type, that is to say a pump arranged in known manner so as to work with liquids which comprise solid particles. The pump 13 draws the brine directly from the tank 10, at 14, in the vicinity of the bottom 10a of the tank, without the interposition of any filter at this point. The pump 13 delivers the brine into a conduit 15, which has its discharge orifice spaced above the top portion of the tank 10 which is provided with a wide opening 17 provided with an edge 18.

Filtering means comprising a number of superimposed baskets 19, 20, 21 are placed above the opening 17 and housed inside the edge 18, and are suspended by hooks 22 from the top of this edge, that is to say in a manner such as to be removable during working. As can be seen from the drawing, the baskets 19, 20, 21 are interposed between the discharge orifice 16 and the tank 10.

The baskets 19, 20, 21 are superimposed, while being spaced apart from each other. These baskets have a mesh opening, that is to say a size of passage holes, which progressively decreases from the top to the bottom in order that the first basket 19 may collect the largest scales, the basket 20 the medium scales and the basket 21 the smallest scales.

The baskets 19, 20 and 21 may be constructed in any appropriate manner, for example of wire mesh or preferably of perforated metal sheet.

During operation, the brine 11 contained in the tank 10 is drawn-in at 14 by the pump 13 and is delivered through the conduit 15 from which it is discharged at 16 into the baskets 19, 20, 21. These baskets retain in order of size the fish scales and other solid impurities, and it is a clear liquid which is returned to the tank 10.

The brine thus circulates in a continuous manner in the tank 10, which ensures excellent conditions of stirring for refrigeration by means of the exchanger 12, and good preservation of the fish is obtained.

It will be noted that the baskets 19, 20 and 21 may be removed, cleaned and replaced in position without it being necessary to stop the circulation of the brine in the conduit 15, which enables the conditions of freezing to be left undisturbed.

It will also be appreciated that the baskets 19, 20 and 21 are of considerable size and in particular have a section substantially greater than the section of the conduits 14 and 15 of the pump 13, which enables large quantities of scales and other solid impurities to be retained and evacuated.

It will also be noted that the suction conduit 14 is free from any filtering means which permits the operation to be carried out without risk of choking at this point, while the pump 13, of the turbid liquid type, also runs no risk of becoming choked, all the more since the continuous circulation through the baskets 19, 20 and 21 enables the brine to be maintained in a state having a low degree of solid suspensions. In particular, with the arrangement according to the invention, in which a large volume of scales is continually retained at 19, 20 and 21 and then evacuated, the bottom 10a of the tank 10 runs no risk of being covered by a layer of scales which would be likely to interfere with the suction at 14.

The installation which has just been described is mainly applicable to freezing tanks, but it may also be applied, if required, to live fish wells.

What I claim is:

1. An installation for the preservation of fish especially on board fishing boats, comprising a tank containing a liquid such as brine and adapted to receive fish, a heat exchanger inside said tank in order to cool said liquid, and a device for circulating the liquid in said tank, in which said circulation device comprises a pump of the turbid liquid type drawing in the liquid directly from the vicinity of the bottom of said tank and delivering said liquid into a conduit which returns it to the tank through a discharge orifice, and further comprising filtering means including at least one foraminous basket of substantial area mounted on the top of said tank in such manner as to be removable during operation, said baskets being interposed between the discharge orifice of said conduit and the tank so as to retain the fish scales and other solid foreign matter, said filtering means comprising a plurality of superimposed foraminous baskets which are spaced apart from each other and the openings of which, that is to say the size of the passage holes, decrease progressively from the top to the bottom of the filter means.

2. An installation for the preservation of fish especially on board fishing boats, comprising a tank containing a liquid such as brine and adapted to receive fish, a heat exchanger inside said tank in order to cool said liquid, and a device for circulating the liquid in said tank, in which said circulation device comprises a pump of the turbid liquid type drawing in the liquid directly from the vicinity of the bottom of said tank and delivering said liquid into a conduit which returns it to the tank through a discharge orifice, and further comprising filtering means including at least one foraminous basket of substantial area mounted on the top of said tank in such manner as to be removable during operation, said baskets being interposed between the discharge orifice of said conduit and the tank so as to retain the fish scales and other solid foreign matter, said tank having at its upper portion an opening having a raised edge, said filtering means being disposed immediately above said opening, inside said edge, said filtering means comprising a plurality of superimposed foraminous baskets, the size of the passage holes of which decrease progressively from the top to the bottom of the filter means, said baskets being supported by hooking on the top of said raised edge.

* * * * *